Oct. 19, 1965     A. MOIO     3,212,696
CAKE BOX
Filed June 30, 1964
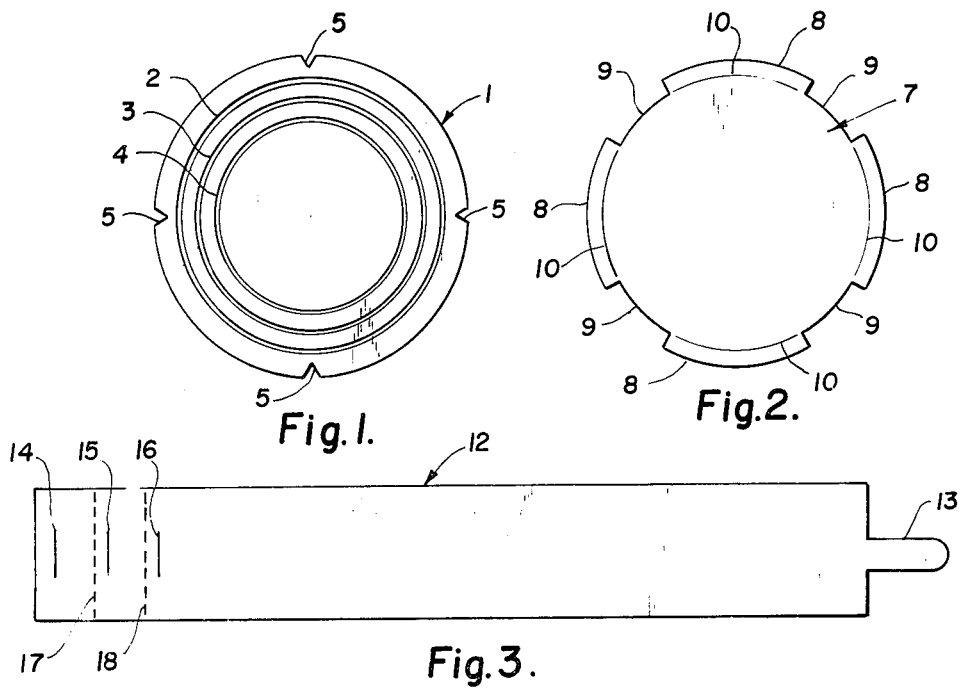
Fig.1.     Fig.2.
Fig.3.
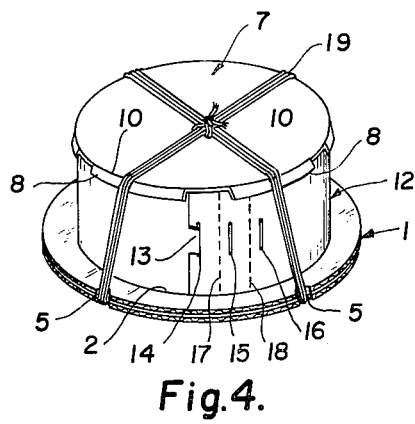
Fig.4.
INVENTOR.
ANTHONY MOIO
BY
*William J. Ruano*
his ATTORNEY

3,212,696
CAKE BOX
Anthony Moio, 6023 Broad St., Pittsburgh, Pa.
Filed June 30, 1964, Ser. No. 379,131
3 Claims. (Cl. 229—23)

This invention relates to a cake box or container and, more particularly, to a box of readily adjustable size so as to fit cakes of different diameters.

An outstanding disadvantages of cake boxes presently used by bakeries, namely, foldable cartons, is that a considerably inventory of boxes of different sizes is required and considerable time is consumed is folding the carton from flat condition into the form of a box.

A further disadvantage is that such boxes are generally substantially larger in size than the cake and are generally rectangular, whereas the cake is round, so that the cake slides when carried in the box.

A still further disadvantage is that considerable difficulty is involved in removing the cake from the box within marring the outer surface of the cake and is generally done by disassembling the box. Furthermore, no suitable means of storage of the cake in a substantially air-tight manner is provided.

An object of my invention is to provide a novel cake box which is devoid of the above-named disadvantages and which is easily and quickly assembled from a minimum number of very simple and inexpensive parts, and which closely fits and rigidly supports the cake when carried without movement or sliding of the cake, and which can be readily opened for easy removal of the cake and then reclosed for storage in a substantially air-tight manner.

A further object of the invention is to provide a cake box having a rigid support which is a component part of the box and which serves as a tray for rigidly supporting the cake when the box is opened.

A still further object of the invention is to provide a novel cake box made of only three standard parts which may be stored in flat condition, and which eliminates the necessity of storage of numerous sizes of boxes, as presently required in bakeries.

Other objects and advantages will become more apparent from the following description taken with the accompanying drawing wherein:

FIG. 1 is a top or plan view of the base of the box;
FIG. 2 is a top or plan view of the cover for the box;
FIG. 3 is a plan or elevational view of a strip of adjustable length for forming the sidewalls of the box; and
FIG. 4 is a perspective view of the box is assembled condition.

Referring more particularly to FIGS. 1 and 4 of the drawing, numeral 1 generally denotes the base of the box which is preferably of stiff cardboard, preferably made up of a plurality of layers so as to provide a firm and unbending support for the cake, and to serve also as a tray for the cake when displayed and when the box is open. A plurality of concentric grooves 2, 3, and 4 are provided so that the box may accommodate cakes of selective diameters, such as 7, 8, and 9 inches diameter. It will be readily apparent that a greater or lesser number of concentric grooves may be used depending on the number of different sizes of cakes to be wrapped. A plurality of notches 5 are provided at evenly spaced intervals along the periphery of base 1. While four such notches are shown, this number may be increased to six or eight if desired.

FIG. 2 shows the cover generally denoted by numeral 7 when in flat condition in the form of a blank. A plurality of arcuate tabs 8 are provided by notching out at 9. By providing arcuate score lines 10, or perhaps perforations, the flaps 8 may be bent at 90° along score line 10 to provide a cover as shown in FIG. 4. If desired, an ordinary hat box type cover having a permanent depending flange 8 without cutouts 9, may be substituted. Moreover, concentric score lines (not shown) may be added for folding along diameters smaller than score line 10 with suitable radial perforations (not shown) along the edges of cutouts 9 for accommodating cakes of different diameter.

FIG. 3 shows a flat strip generally denoted by numeral 12 and preferably of cardboard having an extension or integral tab 13 at one end and a plurality of slots 14, 15, and 16 (or additional slots) at the other end with intermediate score lines or perforations 17 and 18 to enable tearing of selected lengths of the end portion to accommodate cakes of different diameters.

In operation, the baker first takes the standard base 1 on which the cake is already placed as a component part of the cake for display purposes. He then tears off the end of the strip 12 at either perforations 17 or 18 to obtain the desired length of strip without overlapping of the end portion and then projects the lower longitudinal edge portion into one of the grooves 2, 3, or 4 of the base in which it very snugly fits to form a substantially air-tight seal. He then bends flaps 8 at right angles along score lines 10 and finally wraps string 19 in the manner shown in FIG. 4 so as to encompass the entire box and provide a means for carrying the box.

If desired, strip 12 and perhaps cover 7 may be made of transparent plastic material so that the box may even be used for display purposes while in the bakery without drying out which so often happens in bakeries resulting in considerable waste. In short, the completely wrapped box may be placed in display cases and after the selection is made by the customer, the assembled box can be immediately handed to the customer without waiting, therefore, saving considerable time and expense.

If square or rectangular cakes are to be wrapped, cover 7 and base 1 may be rectangular instead and may have concentric rectangular or square grooves.

Thus it will be seen that I have provided a novel and efficient cake box made up of a plurality of simple and inexpensive cardboard or plastic pieces which considerably reduce the amount of inventory necessary for making boxes of different sizes and which may be easily and quickly assembled as well as disassembled; furthermore, I have provided a novel box which closely conforms to the shape and size of the cake so as to eliminate movement while being carried and which may be used after the cake is brought home by the purchaser for storage in a substantially air-tight manner so that the cake will not readily lose its moisture content and thus become stale.

While I have illustrated and described a single specific embodiment of my invention, it will be understood that this is by way of illustration only, and that various changes and modifications may be made within the contemplation of my invention and within the scope of the following claims.

I claim:
1. A cake box comprising a disc-shaped rigid base hav- ing a plurality of notches at evenly spaced intervals along the circumference thereof and having at least one circular groove on the top face, a longitudinal strip having an edge portion which is inserted and snugly fitted in said groove, and a cover having flap means encircling the top longitudinal edge of said strip, and a cord wrapped around said cover and strip and extending through said notches for holding tightly together said cover, strip, and base.

2. A box as recited in claim 1 in which said base is provided with a plurality of concentric grooves and wherein said strip is of adjustable length so that its longitudinal edge is insertable selectively in one of said grooves, said cover having a plurality of arcuately spaced tabs which are foldable along arcuate paths so that the tabs may snugly embrace the top portion of the strip.

3. A cake box comprising a rigid base having a plurality of notches at evenly spaced intervals along the periphery thereof and having a plurality of concentric, looped grooves on the top face, a longitudinal strip having an edge portion which is inserted and snugly fitted in one of said grooves, and a cover having a plurality of flaps circumferentially spaced apart and encircling the top longitudinal edge of said strip, and a cord wrapped around said cover and strip and extending through said notches for holding tightly together said cover, strip, and base.

References Cited by the Examiner

UNITED STATES PATENTS

| 1,205,678 | 11/16 | Staudel. | |
| 1,228,725 | 6/17 | Walter | 229—23 |
| 1,993,355 | 3/35 | Beller | 229—87 X |
| 2,004,098 | 6/35 | Andrews | 229—87 X |
| 2,149,625 | 3/39 | Pabst | 229—21 X |
| 2,329,605 | 9/43 | Gladstein | 229—23 |
| 2,878,932 | 3/59 | Martire | 206—72 |

FOREIGN PATENTS

| 611,263 | 7/26 | France. |

JOSEPH R. LECLAIR, *Primary Examiner.*

FRANKLIN T. GARRETT, *Examiner.*